April 8, 1930.    C. A. BOYER    1,753,738
CASTING REEL
Filed May 11, 1928    2 Sheets-Sheet 2

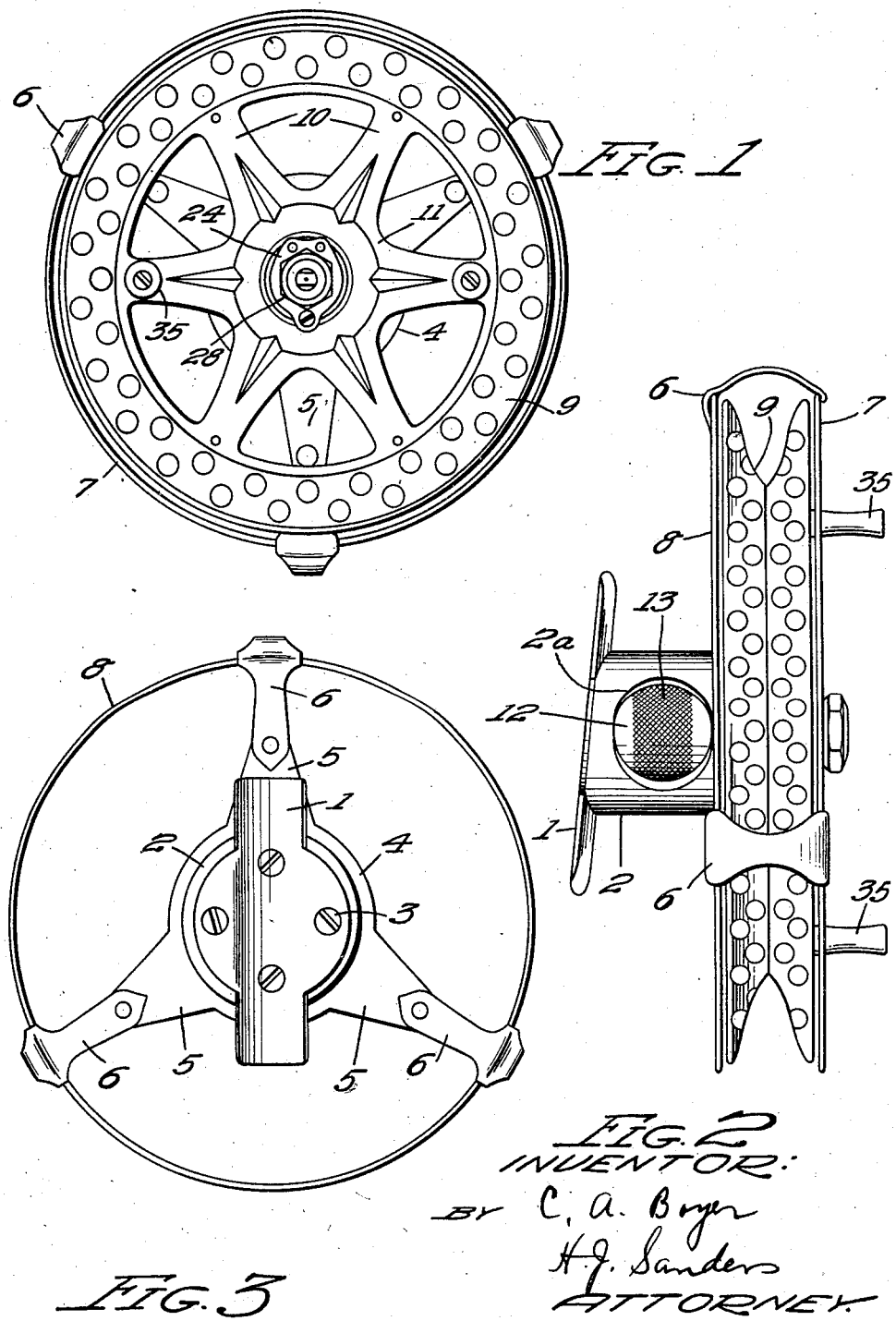

INVENTOR:
C. A. Boyer
BY H. J. Sanders
ATTORNEY

Patented Apr. 8, 1930

1,753,738

UNITED STATES PATENT OFFICE

CHARLES A. BOYER, OF WINONA LAKE, INDIANA

CASTING REEL

Application filed May 11, 1928. Serial No. 276,929.

This invention relates to improvements in casting reels for use in the art of fishing. One object is to provide a reel that is silent in operation, that is self spooling, requiring no attention when reeling in, that is light in weight, free from back lash and that is cheap to manufacture. A further object is to provide a reel whereby it is possible to cast equally well with the right or left hand and whereby the spool runs free, retard mechanism being provided for use when desired. A still further object is to provide means for controlling the spool.

With the foregoing and other object in view the invention consists in the combination and arrangement of parts to be hereinafter fully described, particularly pointed out in the claims and illustrated in the drawings which form a part of this application or patent and in which—

Fig. 1 is a view of the casting reel in front elevation.

Fig. 2 is a side view of Fig. 1.

Fig. 3 is a view of the reel in rear elevation, the spool being omitted.

Like reference characters denote corresponding parts throughout the several views.

Figure 4:
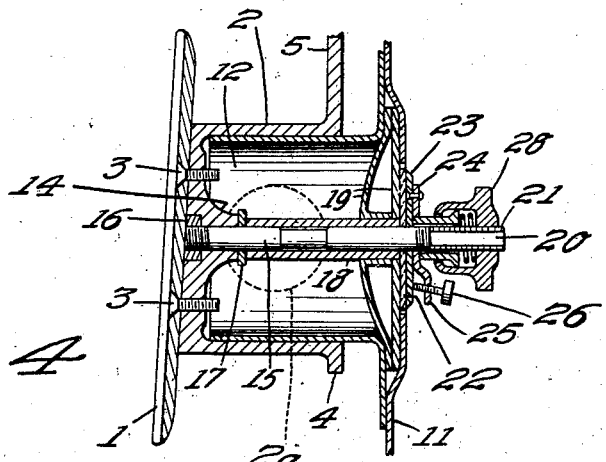
Fig. 4 is an enlarged central sectional view in elevation.
Figure 9:
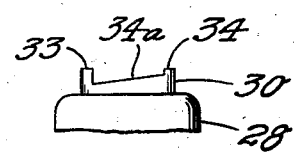
Fig. 9 is an enlarged fragmentary view of Fig. 7.
Figure 5:
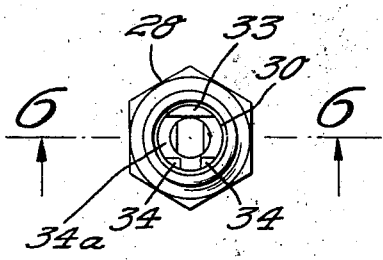
Fig. 5 is a face view of the adjusting nut employed.
Figure 8:
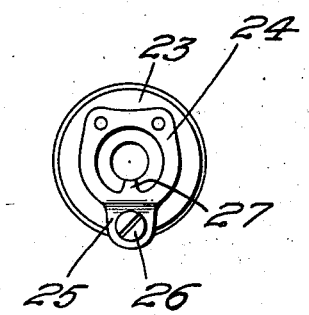
Fig. 8 is a face view of the washer employed.
Figure 6:
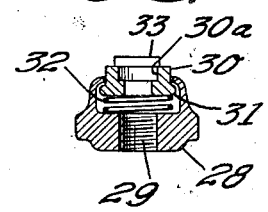
Fig. 6 is a sectional view on line 6—6 of Fig. 5 inverted.
Figure 7:
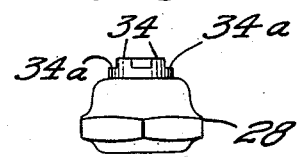
Fig. 7 is a view of Fig. 5 in elevation.

The present reel provides a spool that normally runs freely in a guide frame but that is provided with an adjusting nut whereby a retarding element may be applied and which prevents backlash in the use of the reel, the reel being mounted to a hub casing that is provided with perforations through which the thumb of the operator may be so applied to the moving parts as to provide a retard of a supplementary type when desired. While the adjusting nut herein shown is shown only in connection with the present reel it is capable of use upon reels of other types.

The reel comprises the base plate 1 adapted to be secured to a fishing rod in the usual manner and to the closed outer end of the hub casing 2, having perforations $2^a$, by the screws 3, the open end of said casing being formed with the flange 4 from which the equidistant integral arms 5, three in number preferably, radiate, said arms having secured to the outer ends thereof the angular brackets 6 that carry the spaced rings 7, 8 that form a frame for the spool 9 composed preferably of twin perforate plates secured together and comprising the spokes 10 that merge into the flange 11 of the hub 12 that is formed with peripheral corrugations 13 and is received within the hub casing 2 for rotation, the closed end of said hub casing having a centrally disposed inwardly extending portion 14 bored to receive the stationary shaft 15 and a nut 16 into which one threaded end of said shaft extends, said shaft receiving the washer or collar 17 that rests upon the free end of the casing portion 14, said shaft 15 being received into and extending longitudinally through a rotary sleeve 18 firmly fixed in the perforated closed end 19 of the hub 12, the outer end of said shaft being flattened to form the smooth lateral faces 20 and the relatively narrow threaded faces 21, said shaft beyond the sleeve 18 receiving a felt washer 22 that rests directly against the closed end of the hub and is carried by the circular brake washer 23 that has secured to its opposite face the washer yoke 24, one end 25 of which is offset and carries the screw 26 that bears against the said brake washer 23, the washer yoke 24 being formed adjacent its offset portion with the small inwardly extending tongue 27.

Applied to the outer end of the shaft 15 is the spring nut comprising the head 28 formed with the threaded bore 29 to receive the end of shaft 15 and with an enlarged cavity in its opposite end to receive the stem 30 which is formed at one end with a flange 31, this end of the stem 30 being separated from the head 28 by the expansion coil spring 32, the flange 31 preventing separation of the stem and head, the stem being crimped into the head and inseparable therefrom.

The spring nut and the brake washer assembly are very important and essential features of the invention, the brake device comprising the washer, proper, 23 having the felt face 22 and the yoke 24 which includes the tongue 27. The spring nut head 28 can be manually rotated which will cause it to travel over the flat threaded end of the shaft 15 toward the hub. This movement of the head will cause the spring 32 to exert pressure against the stem 30 which will cause the washer 22 to bear against the hub as a brake to retard rotation of the same. It may be here noted that when the spool is rotated, with its hub, no rotation can be imparted to the stem 30 as this stem is formed with the opposed flat recessed portions 30ª that make it fit upon the flattened faces 20 of the shaft 15 and no rotary movement can, therefore, be imparted through stem 30 to the head 28. The said spring 32 serves to keep the nut from moving accidentally or from vibration that otherwise might result from the rotation of the spool.

The outer end of the stem 30 is formed with an integral lug 33 and opposite thereto with two small spaced integral lugs 34, the stem being bevelled from each lug 34 to the large lug 33 thus forming bevelled portions 34ª, each of which portions assumes its greatest depth at its meeting point with the lug 33. The spool is provided with handles 35 secured directly to spokes 10 whereby it may be rotated together with its integral hub. When the head 28 of the nut is turned into loose position upon the shaft, or screwed outwardly to ease pressure upon the stem 30 by spring 32 the spool will run free. When the head 28 is screwed down, however, the stem will engage with the brake washer assembly in the following manner. At certain positions of the head 28 upon its shaft the rotating hub, when turning in one direction, will cause the brake washer to move into such position that the tongue 27 will be disposed in the deepest portion of the bevel 34ª contiguous to the lug 33 and as long as the hub rotates in the same direction it will receive little or no brake pressure as the tongue then does not bear upon the part 34ª of the non-rotating stem 30. When, however, the rotation of the hub in the opposite direction is started it will cause partial rotation of the brake washer in like direction which will cause the tongue 27 to ride from the deep portion of the bevel 34ª over the slightly bevelled portion, this bevelled portion riding against the tongue will cause that member to press the felt washer against the hub retarding its movement. It will be noted that when the tongue 27 is disposed upon opposite sides of the lug 33 a retard will be imparted to the hub only in its rotation in relatively opposite directions, that is, with the tongue upon the right hand side of the lug 33 a retard to the hub will be imparted when it is rotated in one direction and with the tongue upon the opposite side of lug 33 a retard to the hub will be imparted only when it is rotated in the opposite direction. This fact makes the reel a right or left hand casting reel adapted for use by right or left handed users.

An adjustment of the tongue with relation to the washer 23 is obtained by adjustment of the screw 26, this adjustment providing a more or less positive or quick acting brake for the hub and spool. When the bait is thrown out it is desired to have pressure applied to the hub and this pressure relieved when the line is wound in. The head 28 can, of course, be tightened down to such a degree that a continuous retard is imparted to the hub. It is obvious that a proper adjustment of the spring nut upon its shaft will prevent backlash in casting and afford a smooth retarding action to the spool.

As a substitute for, or in addition to, the automatic brake the caster may apply a retard to the revolving hub by application of his thumb to the corrugated portion 13 thereof through one of the perforations 2ª in the casing. This construction further permits the caster to instantly stop, in like manner, rotation of the spool when the bait alights and to hold the fish when he has been hooked and while he is being played.

What is claimed is:—

1. In a casting reel, a hub casing, a shaft in said casing, a hub mounted thereon for rotation, a spool integral with said hub, a brake washer on said shaft for engagement with said hub, a tongue carried by said brake washer, and a spring nut carried by said shaft for releasable engagement with said tongue.

2. In a casting reel, a hub casing, a shaft in said casing, a hub mounted thereon for rotation, a spool carried by said hub, a brake washer loose on said shaft for engagement with said hub, a tongue adjustably carried by said brake washer, and a spring nut carried by said shaft for releasable engagement with said tongue.

3. In a casting reel, a hub casing, a shaft in said casing, a hub mounted thereon for rotation, a spool integral with said hub, a brake washer loose on said shaft for engagement with said hub, a tongue carried by said brake washer, a spring nut arranged upon said shaft, a large lug at one end of said spring nut, and a small lug directly opposite said large lug, said nut being bevelled between said lugs for selective engagement with said tongue as the hub is rotated in one or the other direction.

4. In a casting reel, a hub casing, a shaft in said casing, a hub mounted thereon for rotation, a spool integral with said hub, a brake washer loose on said shaft for engagement with said hub, a tongue carried by said washer, a spring nut arranged upon said shaft, a lug at one end of said spring nut capable of engagement with said washer, and a small lug opposite said first named lug, the nut end being bevelled between said lugs and upon both sides of each, the said bevelled portions being adapted for selective engagement with the said tongue.

5. In a casting reel, a hub casing, a shaft in said casing, a hub mounted thereon for rotation, a spool integral with said hub, a brake washer loose upon said shaft for engagement with said hub, a tongue adjustably carried by said brake washer, a sectional nut arranged upon said shaft, a spring interposed between said nut sections, a lug at one end of said nut capable of engagement with said washer, and a small lug opposite said first named lug, the nut end being bevelled upon both sides of said lugs in a common direction, either bevelled nut portion being adapted selectively for engagement and release automatically with said tongue as said hub rotates, through a predetermined adjustment of said sectional nut upon its shaft.

6. In a casting reel, a sectional nut, one of the sections thereof being threaded for engagement with the reel shaft, the second section telescopically engaging said threaded section and having its inner end flanged, a spring interposed between said nut sections, and spaced lugs formed upon the outer end of said second section.

7. In a casting reel comprising a hub, a sectional nut comprising a large and a small section, the large section being threaded for engagement with the reel shaft, the small section telescopically engaging the large section and having its inner end flanged, a spring interposed between said nut sections, and spaced lugs formed upon the outer end of the small section for transmitting a retarding action to the reel hub.

In testimony that I claim the foregoing as my own I have hereto affixed my signature.

CHARLES A. BOYER.